US006883845B2

(12) United States Patent
Douziech

(10) Patent No.: US 6,883,845 B2
(45) Date of Patent: Apr. 26, 2005

(54) TWO-HANDLED SHOVEL

(76) Inventor: Maurice J. Douziech, 739 Riddell Street, Edmonton, Alberta (CA) T6K 1A9

( * ) Notice: Subject to any disclaimer, the term of this patent is extended or adjusted under 35 U.S.C. 154(b) by 0 days.

(21) Appl. No.: 10/660,874

(22) Filed: Sep. 12, 2003

(65) Prior Publication Data

US 2005/0017524 A1 Jan. 27, 2005

(51) Int. Cl.[7] ............ A01B 1/22
(52) U.S. Cl. ............ 294/58; 294/57; 16/426
(58) Field of Search ............ 294/57, 58, 54.5; 16/426, 427, 429, 438; 37/265, 285

(56) References Cited

U.S. PATENT DOCUMENTS

| | | | | |
|---|---|---|---|---|
| 725,905 A * | 4/1903 | Williams | ..................... | 294/58 |
| 930,660 A | 8/1909 | Gifford | | |
| 933,647 A | 9/1909 | Hunt | | |
| 3,082,554 A * | 3/1963 | Steeb | ..................... | 294/54.5 |
| 4,050,728 A | 9/1977 | Davidson | ..................... | 294/58 |
| 4,103,954 A | 8/1978 | Vaslas | ..................... | 294/54 |
| 4,200,324 A | 4/1980 | Helton | ..................... | 294/58 |
| 4,264,096 A | 4/1981 | Barnett | ..................... | 294/58 |
| 4,615,553 A | 10/1986 | Hultine | ..................... | 294/58 |
| 4,787,661 A | 11/1988 | Rutledge | ..................... | 294/58 |
| 4,944,541 A | 7/1990 | Waldschmidt | ..................... | 294/58 |
| 5,054,830 A | 10/1991 | Nisenbaum | ..................... | 294/58 |
| 5,133,582 A | 7/1992 | Rocha | ..................... | 294/58 |
| 5,472,252 A * | 12/1995 | Barone | ..................... | 294/58 |
| D377,300 S | 1/1997 | Fredrick von Essen | ........ | D8/10 |
| 5,871,246 A * | 2/1999 | Simdom | ..................... | 294/58 |

* cited by examiner

*Primary Examiner*—Dean J. Kramer
(74) *Attorney, Agent, or Firm*—Macheledt Bales & Heidmiller LLP

(57) ABSTRACT

The present invention is concerned with a two-handled shovel for use in lifting or moving heavy loads, such as snow. The present invention comprises a snow shovel having a second handle assembly pivotally attached to the blade of the shovel. The assembly is an inverted U-shaped element having two legs and a handle grip. Each handle of the shovel has a rotatable hand grip that allows a person to keep their wrists stationary when lifting or moving snow. The second handle assembly further comprises a mechanism for adjusting the length of the legs to suit the person using the shovel.

9 Claims, 7 Drawing Sheets

FIG. 4
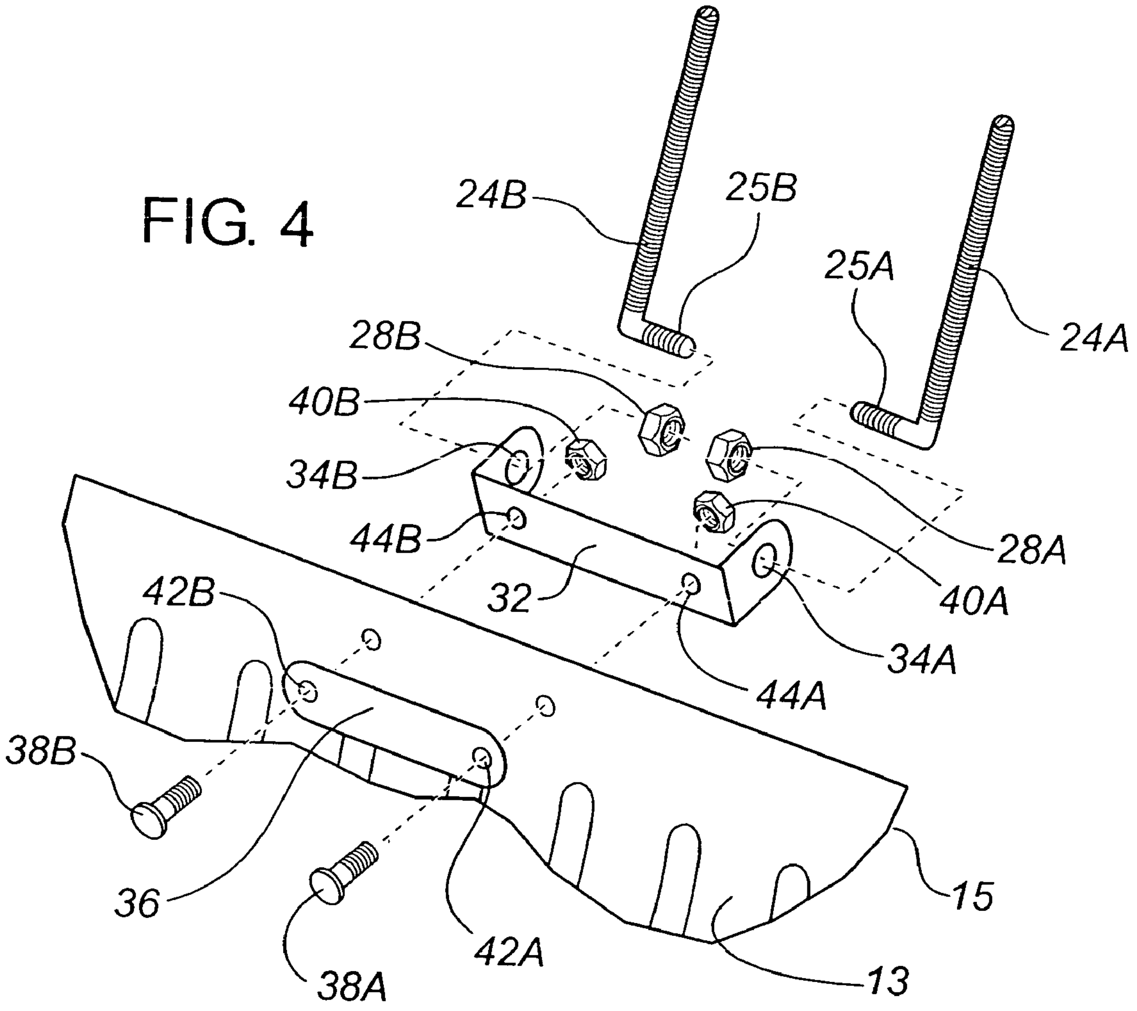
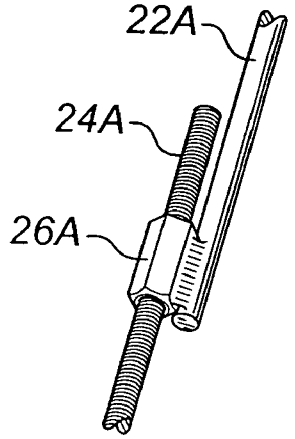
FIG. 5

FIG. 12
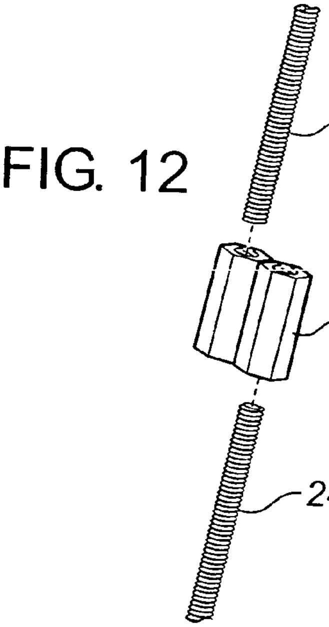
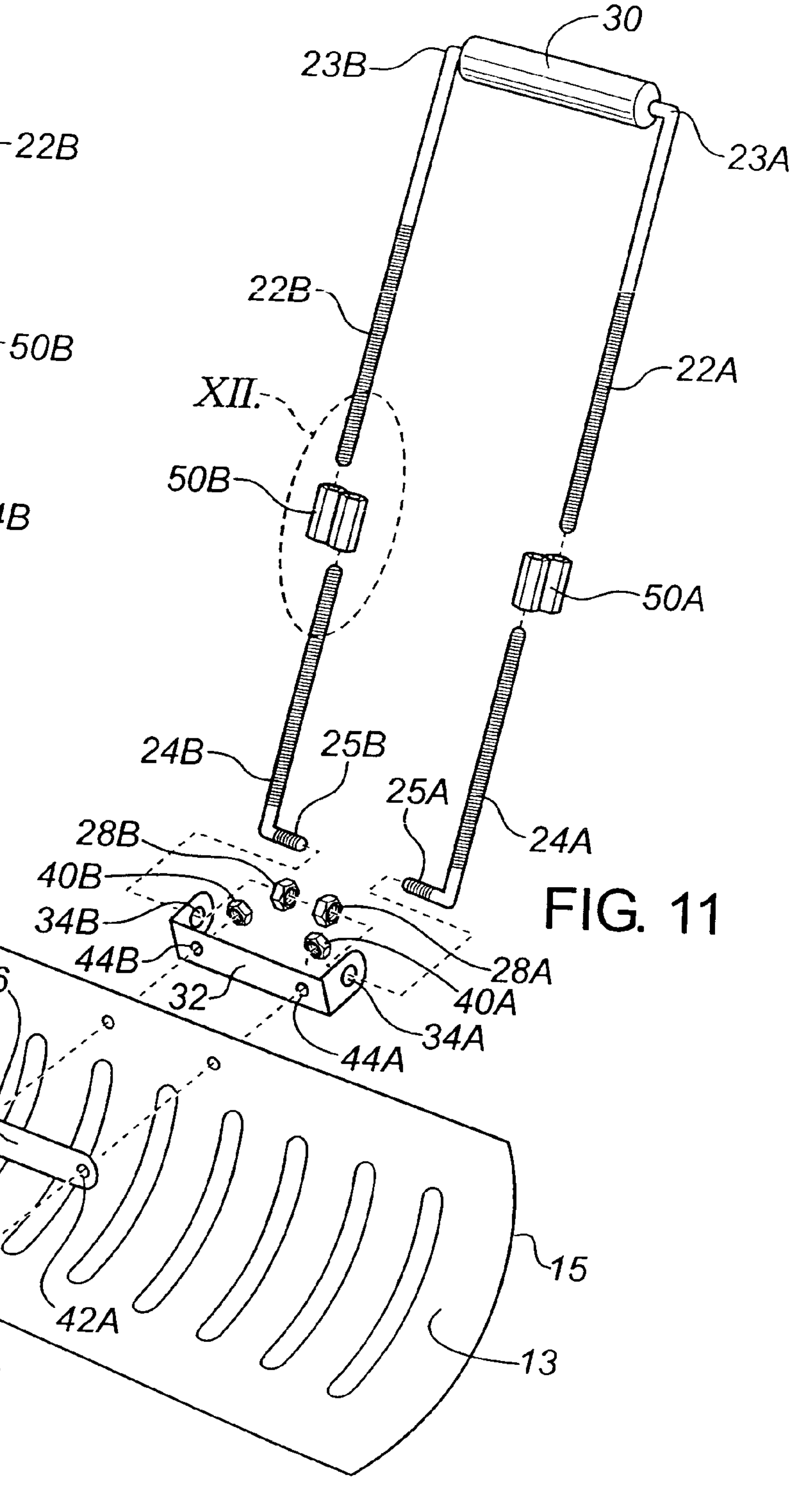
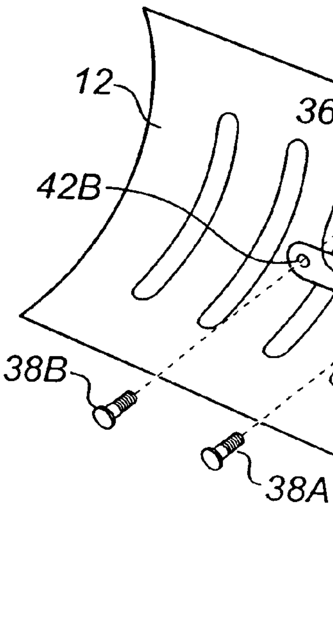
FIG. 11

TWO-HANDLED SHOVEL

FIELD OF THE INVENTION

The present invention relates to the field of two-handled shovels. More specifically, the present invention relates to snow shovels having rotatable hand grips.

BACKGROUND

The concept of two-handled shovels is not new. Many instances of two-handled shovels exist in the prior art. Some examples include accessory handles that attach to the shaft of a conventional shovel whereas other examples may comprise a second handle or shaft or a flexible cord attached to the juncture of the shovel blade and the shaft allowing the shovel to be used with both hands. The second handle provides the ability to apply extra leverage and force to the shovel in lifting and/or moving the load carried by the shovel. The second handle also permits a person to lift or move a heavier load without having to stoop or bend over and grasp the shovel handle near the blade. In moving snow, for example, the snow may be laden with moisture and be very heavy to move. Moving snow under these conditions can be very strenuous and hard on a person's arms and back.

As two-handled shovels are supported by both hands, each handle of the shovel moves along separate paths or arcs as determined by the length of a person's arms. If each handle is gripped tightly in order to move a heavy load with the shovel blade, each hand must turn, at the wrist, in the direction in the shovel is being moved. One hand will turn inward at the wrist whereas the other will turn outward at the wrist. This may cause pain and discomfort if the shovel is being used to move heavy or multiple loads.

It is, therefore, desirable to have a two-handled shovel where the hands do not need to bend or turn at the wrists when lifting or moving a load with a shovel.

SUMMARY

The present invention is concerned with a two-handled snow shovel having rotatable hand grips at each handle. The shovel comprises a shaft with a D-shaped handle with a rotating grip located at the upper end of the shaft. The grip rotates about a rod that extends between the sides of the handle. The lower end of the shaft is inserted into a shaft insert sleeve attached to the rear side of the blade. Mounted near the top of the blade on the rear side is a second handle assembly capable of pivoting forwards and backwards.

In one embodiment of the present invention, the second handle assembly is an inverted U-shaped rod having two legs and a handle portion. The lower end of the assembly is pivotally attached to a pivot bracket mounted on the rear side of the blade between the top edge of the blade and the shaft insert sleeve. The upper end of the second handle assembly comprises a second hand grip also capable of rotating. In an alternate embodiment, the blade is made from injection molded plastic and the pivot bracket is molded as part of the blade itself.

In another embodiment of the present invention, each leg of the second handle assembly is capable of adjusting in length. Each leg is comprised of an upper and lower leg member. The upper leg members and the handle portion are formed from a single piece of solid rod. A rotatable hand grip, such as a piece of thick-walled tube or sleeve, is slipped over the rod before the rod is bent into an inverted U-shaped piece. At the lower end of each upper leg member is a long nut welded to the rod wherein the axis of the nut opening is parallel to the axis of the rod. Each lower leg is a piece of threaded rod that threads into the long nut. The overall length of each leg is then determined by the amount each lower leg is threaded into the long nut. The lower end of each lower leg is bent into an L-shape and placed through apertures in the pivot bracket. Nuts are then threaded on to the end of each lower leg to retain the lower leg to the bracket and permits the second handle assembly to pivot about the pivot bracket connection.

In another embodiment of the present invention, both the upper and lower leg members are made from threaded rod. The upper leg member and handle portion would be made from rod having right-handed threads whereas the lower legs would be made from rod having left-handed threads. The converse could be true as well. To connect the upper legs to the lower legs, a sleeve having internal right-handed threads at one end and internal left-handed threads at the other end are used to couple the upper and lower legs together on each side of the second handle assembly by threading the upper and lower legs into the sleeve. Similar to a turnbuckle, turning the sleeve clockwise or counterclockwise will either shorten or lengthen the overall length of each leg of the second handle assembly.

In another embodiment, both the upper and lower legs are made from threaded rod having right-handed threads. Two long nuts are welded together to form a coupling nut that fastens the upper and lower legs together. The upper leg threads into one of the long nuts of the coupling nut from one end whereas the lower legs threads into the other long nut from the opposite end.

Broadly stated, the present invention is a shovel comprising a shaft having upper and lower ends defining a longitudinal axis, a shovel blade having top and bottom edges, a concave front side and a convex rear side, the rear side having a shaft insert sleeve for receiving the lower end of the shaft, the rear side further having a pivot bracket mounted between the top edge and the shaft insert sleeve, the pivot bracket having opposing left and right apertures that define a pivot axis, the pivot axis substantially perpendicular to the shaft and substantially parallel to the top edge of the shovel blade, a first handle at the upper end of the shaft defining a first axis, the first handle having a first grip, the first grip capable of rotating about the first axis, and a second handle assembly comprising substantially parallel left and right leg portions and a handle portion, each leg portion having upper and lower ends, the upper ends of the leg portions defining a second axis, the hand portion positioned between the upper ends of the leg portions, the lower end of the left leg portion pivotally attached to the left aperture and the lower end of the right leg portion pivotally attached to the right aperture, and a second grip pivotally attached to the handle portion, the second grip capable of rotating about the second axis, the second handle assembly capable of pivoting about the pivot axis.

BRIEF DESCRIPTION OF THE DRAWINGS

FIG. 4 is close-up exploded view of the pivoting bracket of the present invention.

FIG. 5 is close-up view of the left leg of the second handle assembly of the present invention.

FIG. 11 is an exploded perspective view of a second alternate embodiment of the second handle assembly of the present invention.

FIG. 12 is a close-up view of the left leg of the second alternate embodiment of the second handle assembly of the present invention.

DETAILED DESCRIPTION OF THE PREFERRED EMBODIMENT

Figure 1:
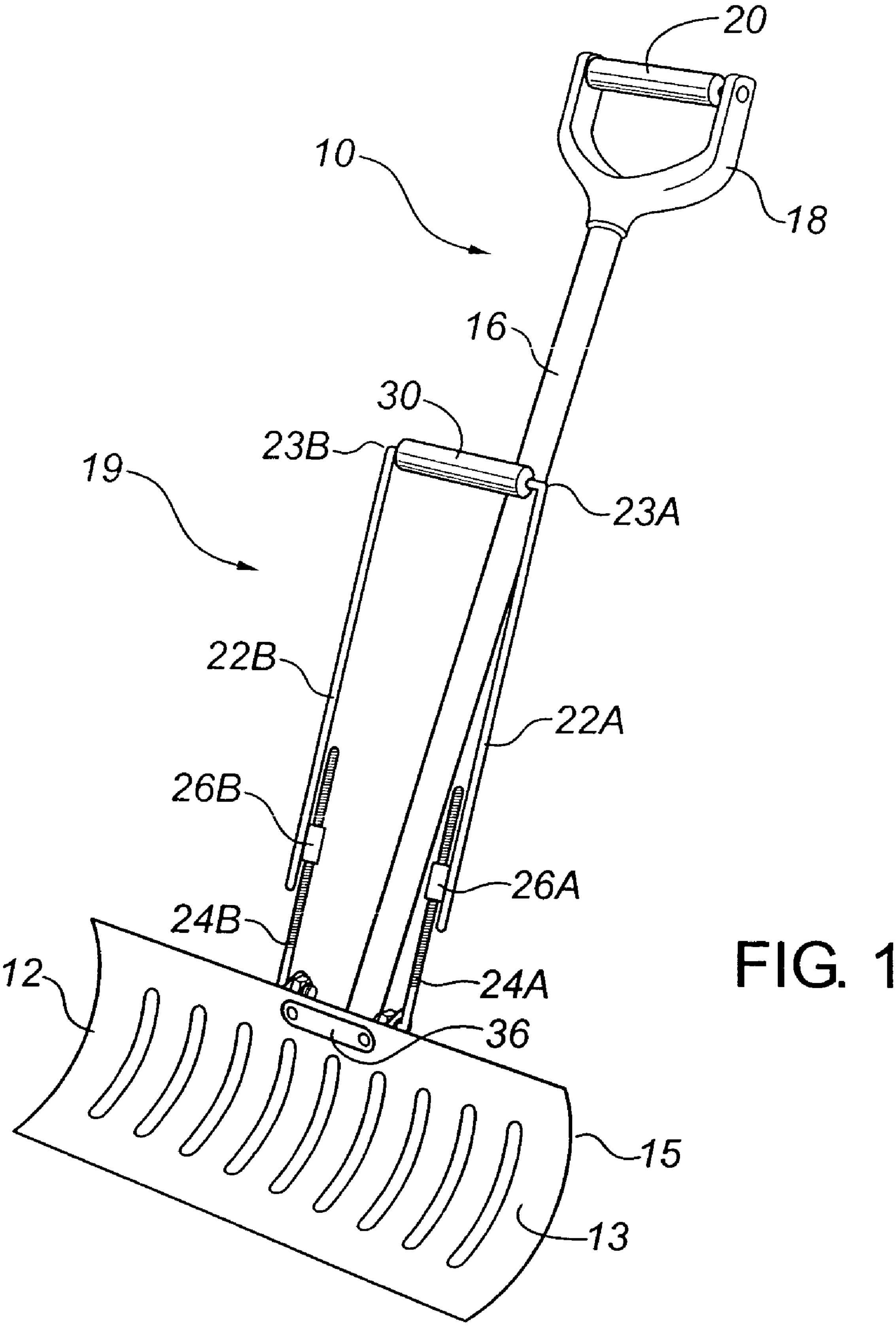
FIG. 1 is perspective view of the present invention.
Figure 2:
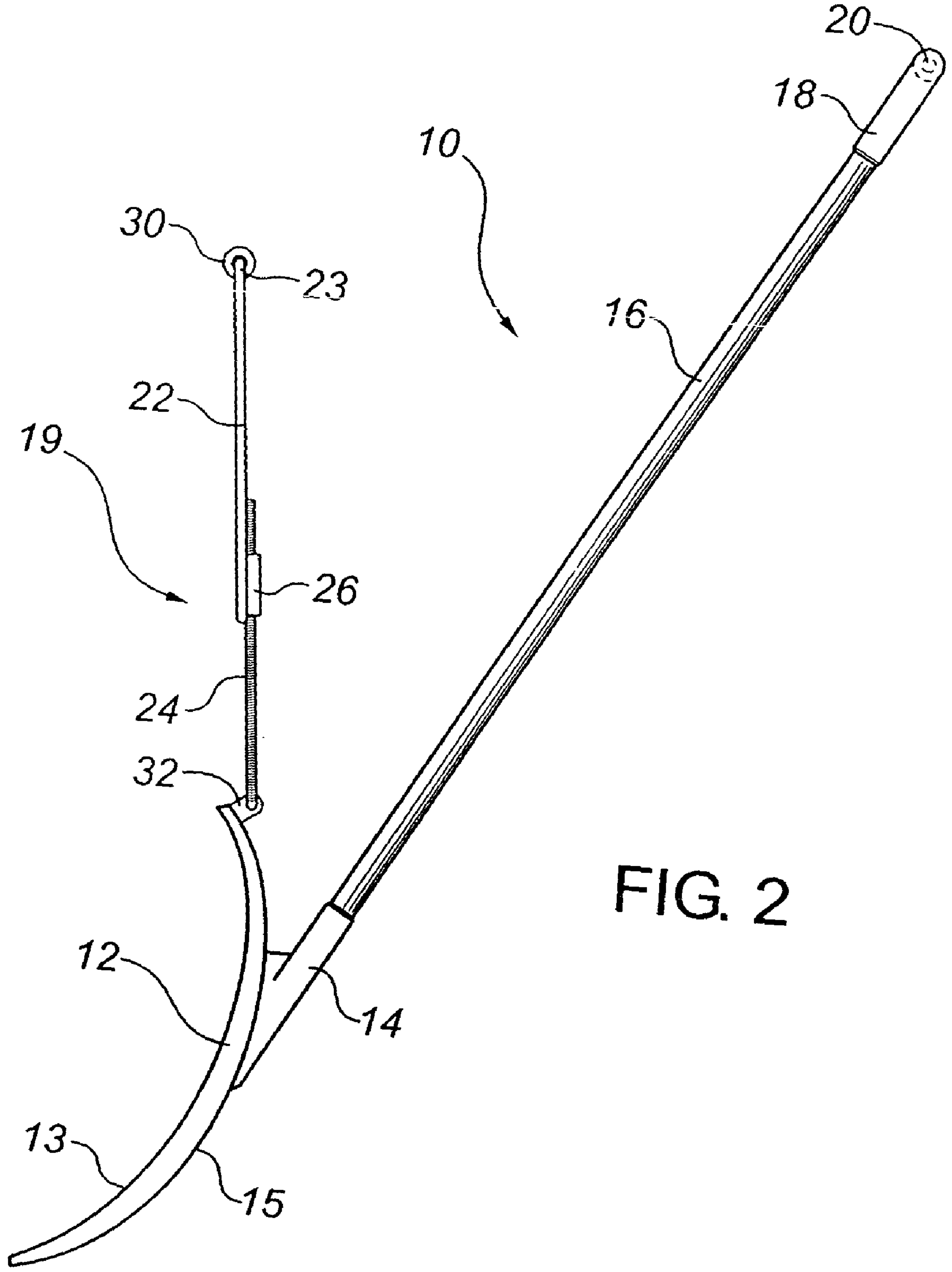
FIG. 2 is a side elevational view of the present invention.

The present invention is concerned with a two-handled shovel having rotatable hand grips at each handle. As shown in FIGS. 1 and 2, shovel 10 comprises a blade 12 having a concave front surface 13 and a convex rear surface 15. On rear surface 15 is shaft insert sleeve 14 which receives the lower end of shaft 16. Handle 18 is mounted on the upper end of shaft 16. Handle 18 is preferably a D-shaped handle and has rotatable hand grip 20. Mounted on blade 12 is U-shaped pivot bracket 32. Attached to pivot bracket 32 is second handle assembly 19. Second handle assembly 19 comprises of upper leg members 22A and B, lower leg members 24A and B and hand grip 30.

Figure 3:
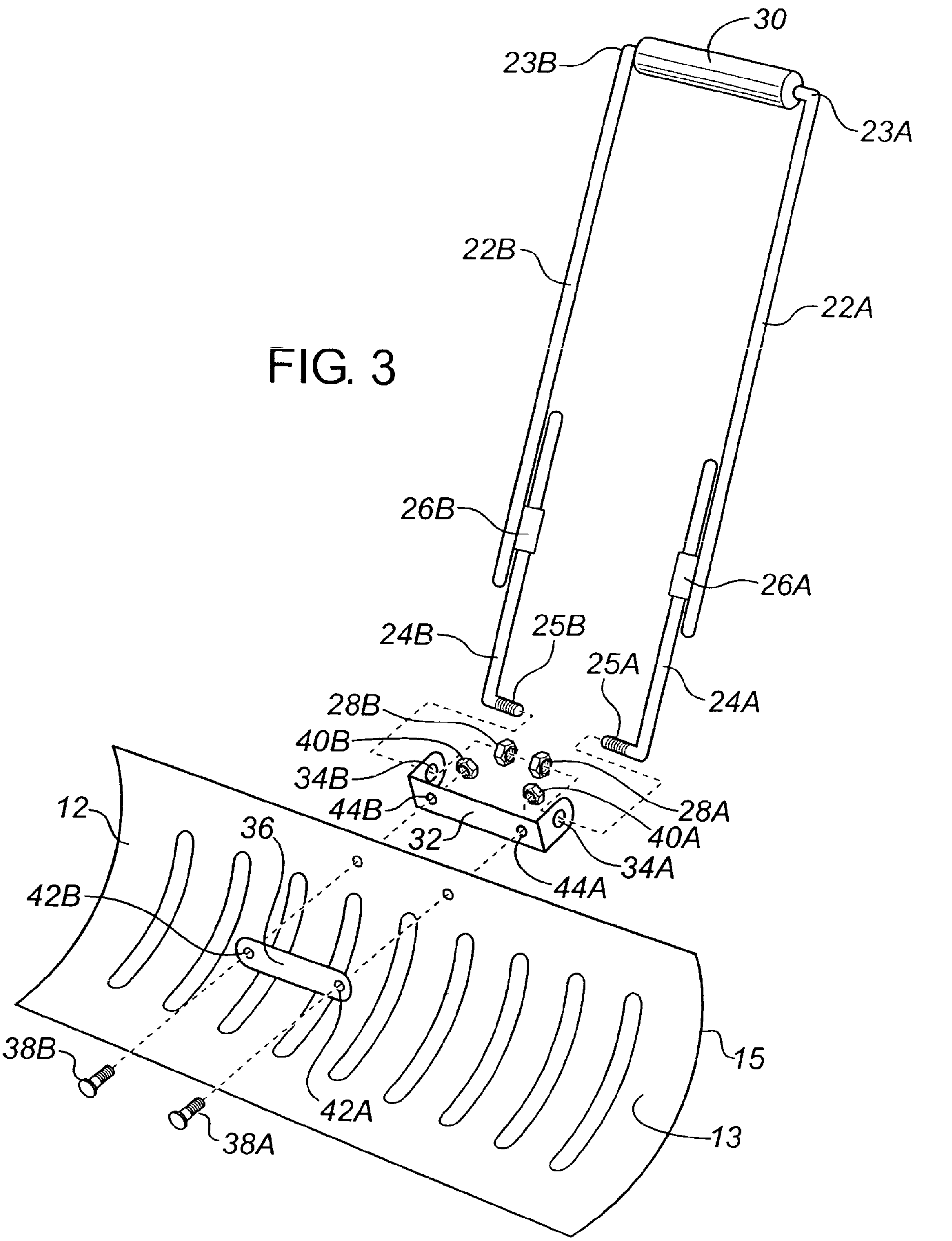
FIG. 3 is an exploded perspective view of the second handle assembly of the present invention.
Figure 8:
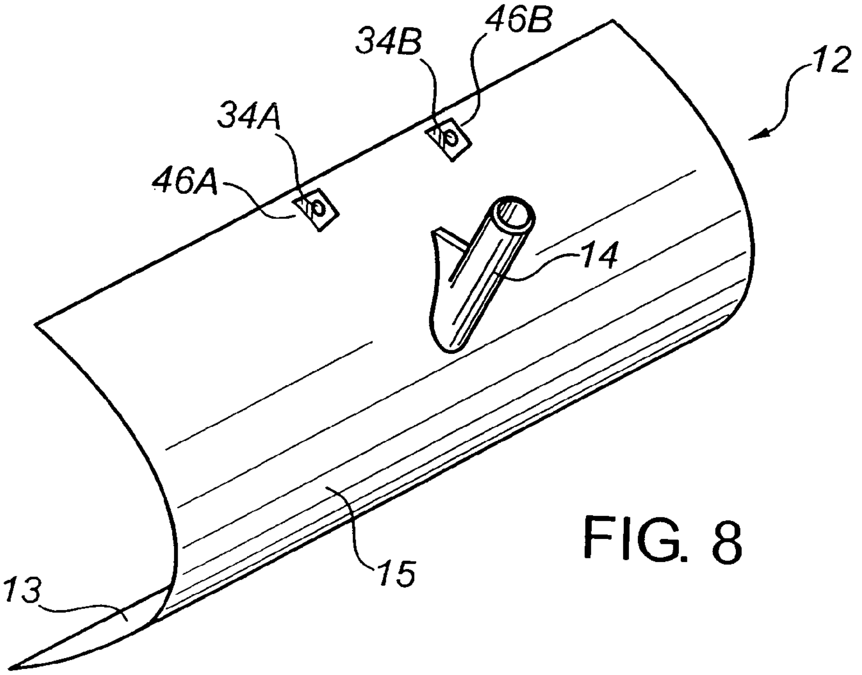
FIG. 8 is a perspective view of an alternate blade of the present invention.

In the preferred embodiment, as shown in FIGS. 3 and 4, pivot bracket 32 is bolted to blade 12 by bolts 38A and B passing through apertures 42A and B of backing plate 36, through corresponding apertures in blade 12, through apertures 44A and B of pivot bracket 32 and secured by nuts 40A and B. Lower legs 24A and B are made of threaded rod whose lower ends are bent 90 degrees into ends 25A and B. Preferably, lower legs 24A and B are made from ¼" or 5⁄16" diameter threaded rod and upper legs 22A and B are made from ¼" or 5⁄16" diameter solid rod. Ends 25A and B pass through apertures 34A and B of bracket 32 and are secured with nuts 28A and B. Preferably, nuts 28A and B are aircraft-style or self locking nuts. In an alternate preferred embodiment, where blade 12 is preferably made of injection-molded plastic as shown in FIG. 8, bracket 32 is formed by bracket ears 46A and B having apertures 34A and B being molded as part of blade 12.

The preferred embodiment of the present invention permits the overall length of second handle assembly 19 to be adjusted. As shown in FIG. 5, the lower end of upper leg 22 has long nut 26 attached to it, preferably welded. The axis of nut 26 is parallel to the axis of upper leg 22. Lower leg 24 is threaded into nut 26. The overall length of second handle assembly 19 is governed by the amount of lower leg 24 is threaded into nut 26.

Figure 6:
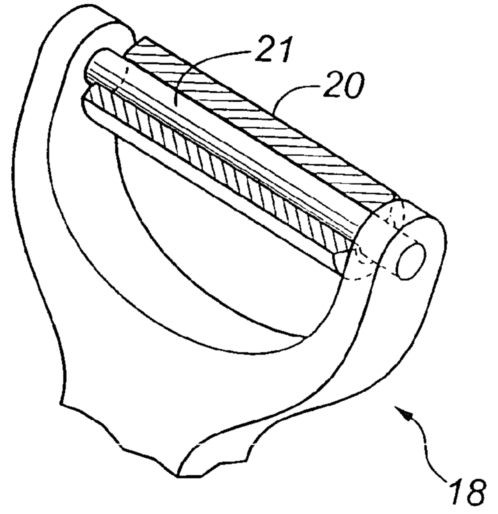
FIG. 6 is cutaway view of the first handle of the present invention.
Figure 7:
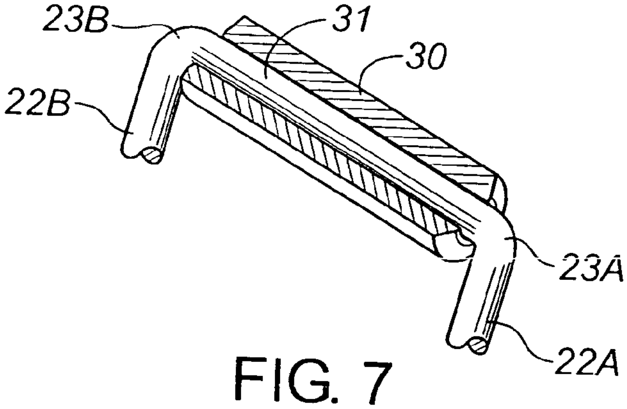
FIG. 7 is a cutaway view of the second handle of the present invention.

Shown in FIG. 6 is a cutaway view of first handle 18. First grip 20 is a cylindrical tube made of suitable material for gripping that rotates about rod 21 that traverses across the mouth of handle 18. As shown in FIG. 7, the preferred embodiment of second handle assembly 19 has the handle portion and both upper legs 22A and B formed from a single piece of rod 31. Second grip 30 is a cylindrical tube made up of material suitable for gripping. Second grip 30 is slid onto rod 31 prior to rod 31 being bent with 90° corners 23A and B thereby containing grip 30 onto second handle assembly 19. Second grip 30 is free to rotate on rod 31.

Figure 9:
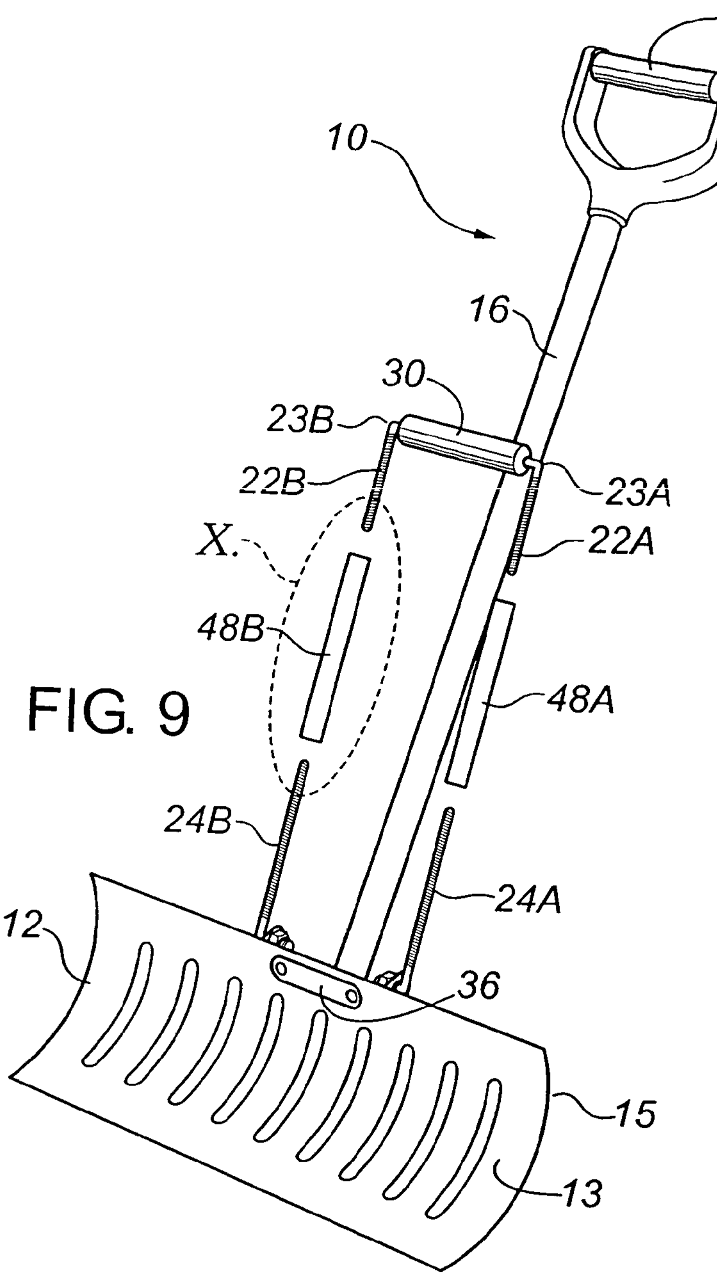
FIG. 9 is an exploded perspective view of a first alternate embodiment of the second handle assembly of the present invention.
Figure 10:
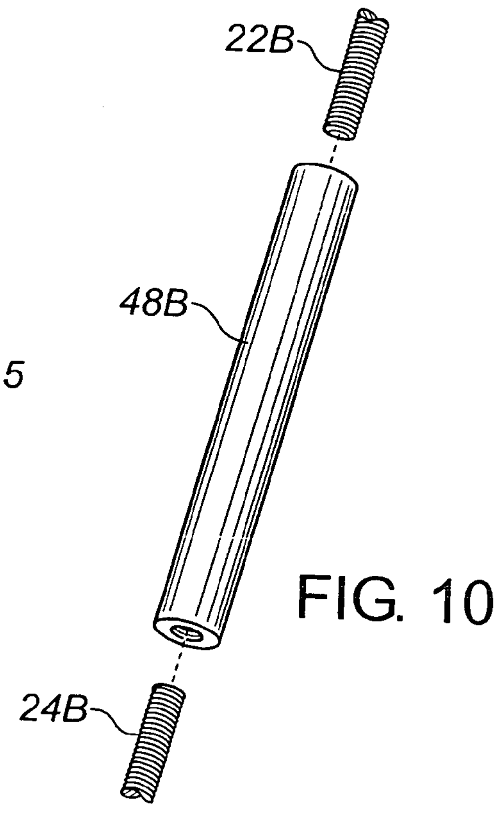
FIG. 10 is a close-up view of the left leg of the first alternate embodiment of the second handle assembly of the present invention.

In an alternate preferred embodiment, as shown in FIGS. 9 and 10, upper legs 22A and B are formed from a piece of right-hand threaded rod, and lower legs 24A and B are formed from left-hand threaded rod, both upper and lower legs are preferably made from ¼" or 5⁄16" diameter threaded rod. Alternatively, upper legs 22A and B can have left-hand threads and lower legs 24A and B can have right-hand threads. Sleeves 48A and B are then used to couple the upper and lower legs together. Sleeves 48A and B have internal right-hand threads at one end and internal left-hand threads at the other end. Upper legs 22A and B and lower legs 24A and B are then threaded into the appropriate end of sleeves 48A and B. Operating similar to that of a turnbuckle, the length of the legs of second handle assembly 19 is adjusted by turning sleeves 48A and B clockwise or counter-clockwise.

In another preferred embodiment, as shown in FIGS. 11 and 12, upper legs 22A and B and lower legs 24A and B are made from threaded rod having right handed threads, preferably ¼ or 5⁄16 in diameter. Coupling nuts 50A and B are used to join the upper and lower leg members together and to permit adjustment of the overall length of the second handle assembly 19. Coupling nut 50 consists of two long nuts 26 welded together side by side. Upper leg 22 threads into one nut of coupler nut 50 from one end while lower leg 24 threads into the other nut of coupler nut 50 from the opposite end. The overall length of each leg of second handle assembly 19 is determined by the amount upper leg 22 and lower leg 24 are threaded into coupler nut 50 prior to attaching end 25 to aperture 34 of bracket 32.

In operation, a person grabs grips 20 and 30 of shovel 10 with their hands. As shovel 10 is swung back or pushed forwards, grips 20 and 30 rotate on rods 21 and 31, respectively. This permits the person to keep their wrists stationary or in a locked position as shovel 10 is used to lift or move a load thereby reducing undue stress or strain on the wrists.

While the preferred embodiment comprises a second handle assembly with two parallel legs, it is anticipated that the second handle assembly may consist of a single leg with its lower end pivotally attached to the shovel blade and its upper end comprising a rotatable hand grip. In addition, while the present invention has an application in use with snow shovels, it is anticipated that the present invention may have application in other forms of shovels and other tools used in the lifting and moving of materials such as hay, grain, soil, or coal, as examples.

Although a few preferred embodiments have been shown and described, it will be appreciated by those skilled in the art that various changes and modifications might be made without departing from the scope of the invention. The terms and expressions used in the preceding specification have been used herein as terms of description and not of limitation, and there is no intention in the use of such terms and expressions of excluding equivalents of the features shown and described or portions thereof, it being recognized at the scope of the invention as defined and limited only by the claims that follow.

I claim:

1. A shovel, comprising:

a) a shaft having upper and lower ends defining a longitudinal axis;

b) a shovel blade having top and bottom edges, a concave front side and a convex rear side, the rear side having a shaft insert sleeve for receiving the lower end of the shaft, the rear side further having a pivot bracket mounted between the top edge and the shaft insert sleeve, the pivot bracket having opposing left and right apertures that define a pivot axis, the pivot axis substantially perpendicular to the shaft and substantially parallel to the top edge of the shovel blade;

c) a first handle at the upper end of the shaft defining a first axis, the first handle having a first grip, the first grip capable of rotating about the first axis; and d) a second handle assembly comprising substantially parallel left and right leg portions and a handle portion, each leg portion having upper and lower ends, the upper ends of the leg portions defining a second axis, the handle portion positioned between the upper ends of the leg portions, the lower end of the left leg portion pivotally attached to the left aperture and the lower end of the right leg portion pivotally attached to the right aperture, and a second grip pivotally attached to the handle portion, the second grip capable of rotating about the second axis, the second handle assembly capable of pivoting about the pivot axis.

2. The shovel as set forth in claim 1 wherein the first axis is substantially perpendicular to the longitudinal axis of the shaft.

3. The shovel as set forth in claim 2 wherein the first axis is substantially parallel to the top edge of the shovel blade.

4. The shovel as set forth in claim 1 wherein the second axis is substantially perpendicular to the leg portions.

5. The shovel as set forth in claim 4 wherein the leg portions and the handle portion are formed from an inverted U-shaped rod and the second grip is a tubular member that slides onto the rod prior to being formed into an inverted U-shape.

6. The shovel as set forth in claim 5 wherein the leg portions have means for varying the length of said leg portions.

7. The shovel as set forth in claim 6 wherein the means for varying the length of the leg portions comprises each leg portion having upper and lower leg members, each lower leg member being a threaded rod, each upper leg member having a nut for receiving the threaded rod of the lower leg members whereby the overall length of each leg portion is determined by the amount the lower leg member is threaded into the nut of the upper leg member.

8. The shovel as set forth in claim 6 wherein the means for varying the length of the leg portions comprises each leg portion having upper leg members made of threaded rod with threads of one orientation and lower leg members made of threaded rod with threads of an opposite orientation, and a sleeve for each leg portion, the sleeve having two ends with internal threads of one orientation at one end and internal threads of the opposite orientation at the other end, each sleeve capable of coupling a pair of upper and lower leg members together whereby the overall length of each leg portion is determined by the amount each upper and lower leg member is threaded into its respective sleeve.

9. The shovel as set forth in claim 6 wherein the means for varying the length of the leg portions comprises each leg portion having upper and lower leg members made of threaded rod, and a coupling nut for each leg portion, the coupling nut having two nuts adjoined to one another side by side whereby an upper leg threads into one nut of the coupling nut from one end and a lower leg threads into the other nut of the coupler nut from the opposite end, and whereby the overall length of each leg portion is determined by the amount each upper and lower leg member is threaded into its respective coupling nut.

* * * * *